(12) United States Patent
Smith et al.

(10) Patent No.: US 7,773,582 B2
(45) Date of Patent: Aug. 10, 2010

(54) DYNAMIC VOICE OVER INTERNET PROTOCOL ENDPOINT MAPPING

(75) Inventors: Lawrence Joseph Smith, Hollis, NH (US); John David Doyle, Hollis, NH (US); Feng Chen, Chelmsford, MA (US); Luis Zamora, Londonderry, NH (US)

(73) Assignee: Empirix Inc., Bedford, MA (US)

( * ) Notice: Subject to any disclaimer, the term of this patent is extended or adjusted under 35 U.S.C. 154(b) by 927 days.

(21) Appl. No.: 11/265,379

(22) Filed: Nov. 2, 2005

(65) Prior Publication Data

US 2006/0109838 A1 May 25, 2006

Related U.S. Application Data

(60) Provisional application No. 60/629,584, filed on Nov. 19, 2004.

(51) Int. Cl.
*H04L 12/66* (2006.01)
(52) U.S. Cl. .................................. 370/352; 370/401
(58) Field of Classification Search ................ 370/352, 370/401; 709/234, 224; 379/137, 133, 126
See application file for complete search history.

(56) References Cited

U.S. PATENT DOCUMENTS

| 6,842,447 | B1 | 1/2005 | Cannon et al. |
| 6,954,520 | B1* | 10/2005 | Lang et al. ................... 379/137 |
| 2002/0141386 | A1 | 10/2002 | Minert et al. |
| 2003/0214963 | A1* | 11/2003 | Moody et al. ................ 370/410 |
| 2003/0214971 | A1* | 11/2003 | Sheldon et al. .............. 370/467 |
| 2003/0227908 | A1 | 12/2003 | Scoggins et al. |
| 2005/0094623 | A1* | 5/2005 | D'Eletto ...................... 370/352 |
| 2005/0195745 | A1* | 9/2005 | Scott et al. ................... 370/241 |

* cited by examiner

*Primary Examiner*—Steven H Nguyen
(74) *Attorney, Agent, or Firm*—SilverSky Group, LLC

(57) ABSTRACT

A method, apparatus and computer program product for performing dynamic Voice Over Internet Protocol (VOIP) endpoint mapping is presented. At least one on net endpoint of a VOIP call is determined. An endpoint data structure is used to store, for each on net endpoint of the call, a key and at least one of an Internet Protocol (IP) address of the end point, a phone number associated with the endpoint, and/or a display name associated with the endpoint. The endpoint data structure is used to correlate call legs across a network. Heuristics of the VOIP call are determined, the heuristics including information relating to the main source call leg and the main destination call leg.

26 Claims, 5 Drawing Sheets

10 ⟶

| KEY | IP address | Phone # | Display Name |
|---|---|---|---|
| aaln/1@abcde114078905.foo.net | 24.241.66.214 | | |
| aaln/1@jklmn54217211.foo.net | 10.33.60.58 | 9998887777 | |

ND INTERNET PROTOCOL ENDPOINT MAPPING

DYNAMIC VOICE OVER INTERNET PROTOCOL ENDPOINT MAPPING

CROSS REFERENCE TO RELATED APPLICATIONS

The present application claims the benefit of U.S. Provisional Patent Application No. 60/629,584, filed on Nov. 19, 2004, which is incorporated herein by reference in its entirety.

BACKGROUND

Voice over Internet Protocol (VOIP) is a technology that allows persons to send and receive voice, fax and data information over a combination of a phone network and a digital communications network. In traditional circuit switched networks such as a phone network, when a communication is established, a channel is dedicated end-to-end for the duration of the communication. Any unused bandwidth within the channel is unusable until the call is terminated. Research has shown that approximately sixty percent of a speech-based call is silence, thus a large portion of the bandwidth of a phone network is wasted. This is directly contrary to packet networks, wherein many types of communications share the bandwidth of the packet network. The capacity of the packet network is filled much more effectively in packet switched networks. Voice activity detection (VAD) technologies used in preparing voice signals for transporting across a packet network eliminate the silent space of a VOIP call in order to save more bandwidth, and speech compression technologies reduce the amount of data that must be transmitted when voice activity is present. By merging voice with the Internet or with an Intranet within an enterprise, the long distance telephone network and associated toll charges may be bypassed all together.

In a VOIP environment voice signals are processed for transport over a packet network. The VOIP environment includes a pair of gateways, one at each end of the packet network. The gateways perform the compression and packetizing necessary to accomplish VOIP. The voice signal is received by a first gateway, where the voice signal is then compressed and packetized. The packets are sent out on the packet network. The packets are received by the second gateway from the packet network. The second gateway converts the packets back into a voice signal.

The protocols that define a data network were originally designed for non-real time traffic. In traditional digital packet networks, when a router or switch becomes overloaded with packets, the router or switch may drop packets in order to relieve the congestion. The end protocols have methods built into them to account for the dropped packets by routers and switches within the network such that data integrity is maintained, such as by requesting retransmission.

A VOIP call can be considered a logical entity having 1 to n call legs. A call leg is a portion of a VOIP call. A call leg is made up of protocol messages. An endpoint is either the starting point of a call or the terminating point of a call. An endpoint can be either on net (inside the customers network) or off net (outside the customers network.)

SUMMARY

Conventional mechanisms such as those explained above suffer from a variety of deficiencies. One such deficiency is that in VOIP calls when a call crosses end points, it becomes difficult to correlate the various calls and to provide heuristics relating to the various calls.

Embodiments of the invention significantly overcome such deficiencies and provide mechanisms and techniques that provide dynamic VOIP endpoint mapping such that calls can be correlated across a network.

In a particular embodiment of a method for providing dynamic Voice Over Internet Protocol (VOIP) endpoint mapping, the method includes identifying in the VOIP call a main source leg and a main destination leg. The method also includes determining at least one on net endpoint of the VOIP call. The method further includes storing, in an endpoint data structure, for each on net endpoint of the call a key and at least one of an Internet Protocol (IP) address of the end point, a phone number associated with the endpoint, and a display name associated with the endpoint. The method additionally includes using the endpoint data structure to correlate call legs across a network. Heuristics of the VOIP call are then determined, the heuristics including information relating to the main source call leg and the main destination call leg.

Other embodiments include a computer readable medium having computer readable code thereon for providing dynamic Voice Over Internet Protocol (VOIP) endpoint mapping. The medium includes instructions for identifying in the VOIP call a main source leg and a main destination leg and for determining at least one on net endpoint of the VOIP call. The medium further includes instructions for storing, in an endpoint data structure, for each on net endpoint of the call a key and at least one of an Internet Protocol (IP) address of the end point, a phone number associated with the endpoint, and a display name associated with the endpoint. The medium additionally includes instructions for using the endpoint data structure to correlate call legs across a network, and for determining heuristics of the VOIP call, the heuristics including information relating to the main source call leg and the main destination call leg.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides dynamic VOIP endpoint mapping as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing dynamic VOIP endpoint mapping as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Empirix Inc. of Bedford, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
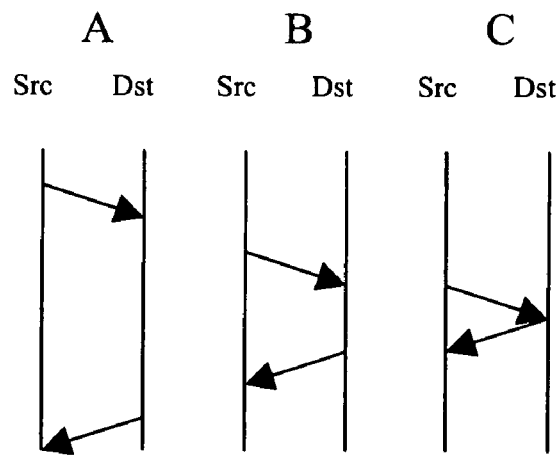
FIG. 1 illustrates a VOIP call having three legs.

Referring to FIG. 1, a call 10 is shown. Call 10 includes a first leg A, a second leg B and a third leg C. The combination of legs A,B,C make up the call 10 and each arrow within a leg represents a protocol message. Each call leg has a direction. The direction is determined by the first message in the call leg (this is the message that starts the call leg). Each call leg has a Source side and a Destination side. In call 10, call legs A and C are end points and call leg B is not.

A correlation engine can be configured to know which endpoint addresses are on net and which are not. This allows the correlation engine to have some heuristics based on whether a call leg has an on net end point.

In conventional systems each call has a main leg. This main leg is the call leg with the earliest timestamp, out of all the call legs for this call. The main leg is used to get the statistics of the call. For example, the start time of the call is the start time of the main leg, the call length for the call is the call length of the main leg, the Post Dial Delay (PDD), Call Length (CL), and Dial Tone (DT) for the call are all retrieved from the main leg, and the Source and Destination (called From and To) are the source and destination of the main leg.

Figure 2:
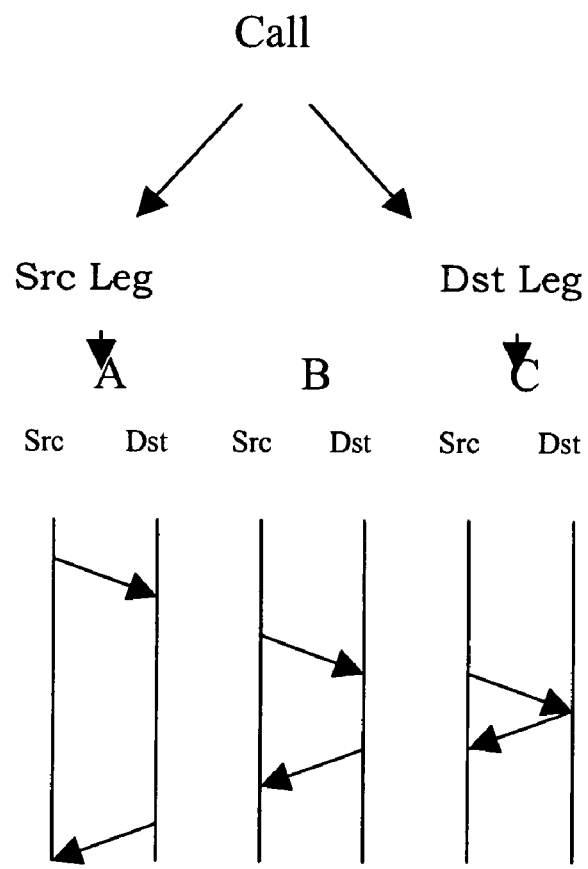
FIG. 2 illustrates a call having as source leg and a destination leg

In a particular embodiment of a method for performing dynamic VOIP endpoint mapping, a call is defined having two main legs, a source (Src) leg and a destination (Dst) leg as shown in FIG. 2. The Src Leg is defined as the call leg with the earliest timestamp with its Src IP address equal to an on net endpoint or the earliest call leg. The Dst Leg is defined as the call leg with the latest timestamp with its Dst IP address equal to an on net endpoint or the latest call leg, but the Dst can not equal the Src if there is more than one call leg. The SRC leg and the DST leg of the same call can be correlated by way of the endpoint mapping data structure such that both legs are included when determining heuristics of the call, thereby providing more accurate and meaningful measurements and resulting data. In a particular embodiment the end point mapping data structure is realized as a table.

Figure 3A:
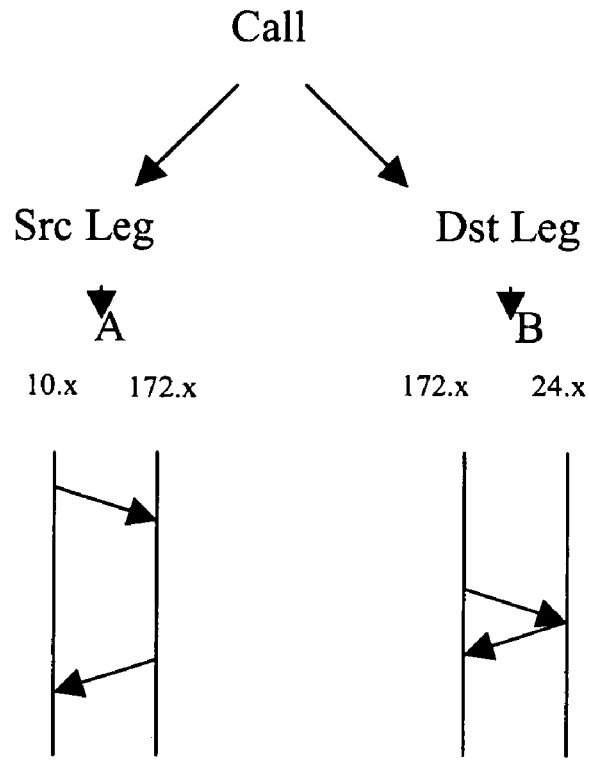
FIG. 3A illustrates the source and destination call leg of an on net to on net call.
Figure 3B:
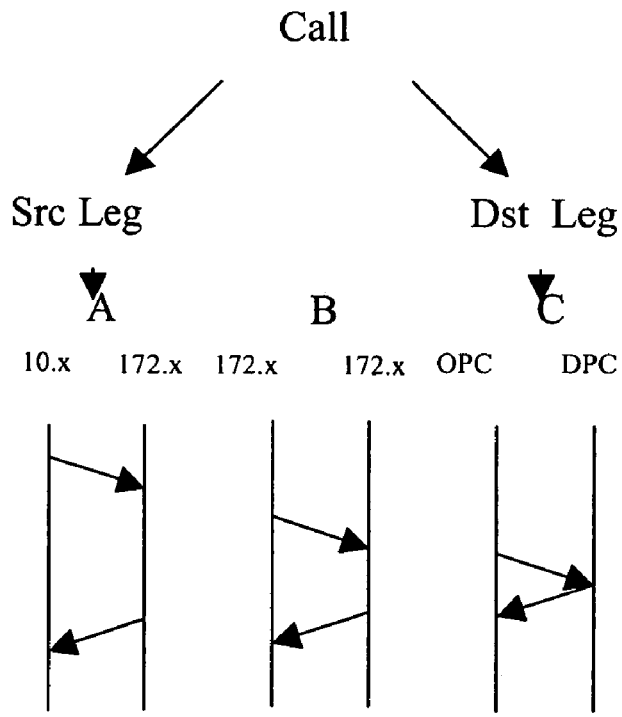
FIG. 3B illustrates the source and destination call leg of an on net to off net call.
Figures 3C, 4:
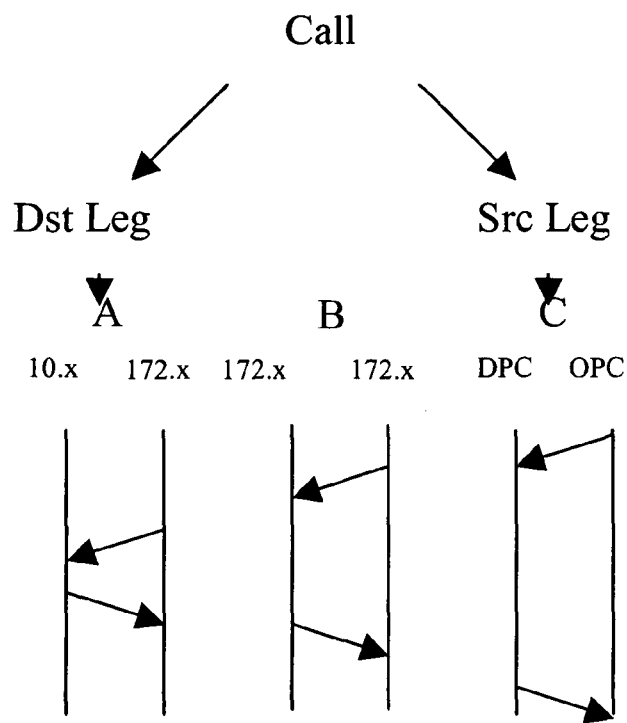
FIG. 3C illustrates the source and destination call leg of an off net to on net call.
FIG. 4 illustrates an example endpoint data structure.

To help visualize the different types of VOIP calls, FIGS. 3A, 3B and 3C show the different kinds of calls (on net to on net, on net to off net, and off net to on net). The on net phone end points have addresses starting with 10 or 24 and the switches and gateways have addresses that start with 172.

In FIG. 3A, a call 40 has a source (SRC) leg 42 and a destination (DST) leg 44. The source leg 42 begins with an on net endpoint, indicated by the address 10.X and extends to a first off net gateway address 172.X. The destination leg 44 receives the call at a second gateway address 172.X and forwards it to another on net endpoint 24.X. This type of call is referred to as an on net to on net call since the source of the call is on net and the destination of the call is on net.

Referring now to FIG. 3B, an on net to off net call 50 is shown. The call 50 has a source (SRC) leg 52 and a destination (DST) leg 54. The source leg 52 begins with an on net endpoint, indicated by the address 10.X and extends to a first gateway address 172.X. A middle leg receives the call at a second gateway address 172.X and forwards it to a third gateway address 172.X. The third gateway address forwards the call to an Originating Point Code (OPC) where it is forwarded to a Destination Point Code (DPC).

In FIG. 3C, an off net to on net call is shown. The call 60 has a source (SRC) leg 62 and a destination (DST) leg 64. The source leg 62 begins with an call from an Originating Point Code (OPC) to a Destination Point Code (DPC). A middle leg receives the call from the DPC at a first gateway address 172.X and forwards it to a second gateway address 172.X. The call is forwarded from the second gateway to a third gateway address 172.X and from there to an on net endpoint, indicated by the address 10.X.

Referring now to FIG. 4 a particular embodiment of an End Point Table 70 is shown. A Correlation Engine keeps track of on net end points. For each on net end point it will keep: a KEY 72, IP Address 74, a phone number 76, and a Display Name 78. The KEY 72 is used as the unique key for the end point. The data for the end points is kept in an Internal End Point Table.

The end point table 70 is periodically written to disk (e.g., as a .csv fil)e and at startup of the software the end point table 70 will be read in from disk. By using a .csv file as storage for this table, it is possible to pre-populate the end point table when the data is available.

The following example is for a specific implementation. Other implementations may also be utilized to provide a similar function. In this particular implementation, the end point table is encapsulated in a class that defines an interface to this table as well as reading and writing it to disk. This interface has the following methods:

```
// Lookup the table entry with the given KEY. Returns true and
// the fields if found. Returns false otherwise.
    bool Lookup(const char* string KEY,
            string& retIPAddress,
            string& retPhone#,
            string& retDisplayName);
// Set/Update the Table entry for the given KEY. If the KEY
// already exist update the entry, if it does not create it.
    void Update(const char* string KEY,
            const char* szIPAddress,
            const char* szPhone#,
            const char* szDisplayName);
```

The call object is modified to have the Src IP address, Src Phone Number, Dst IP Address, and Dst Phone Number, Src Display Name, Dst Display Name. Optionally the Caller ID (or display name) can be kept and/or displayed as well. This requires an additional two fields (Src Name, Dst Name). This can be shown in the Call Info tab, and allows for searching on name.

The following helper functions are added to the Call object to aid in saving to the database:
GetDstPhone( )
GetDstIP( )
GetSrcPhone( )
GetSrcIP( )
GetEndSecs( )
GetEndMsecs( )
SetEndTime(secs, msecs)
GetSrcDisplayName( )
GetDstDisplayName( )

For SS7 endpoints the OPC will be returned for the SrcIP and the DPC will be returned for the DstIP.

The following new member variables have been added to the class:
m_endTimeSecs
m_endTimeMsecs When a call is complete the AssocCDR end time (m_endTimeSecs, m_endTimeMsecs) is set with the end time of the last leg. This may lead to the end time not being equal to the call start time plus the call length but it will exactly synchronize the end time with the tracking data, which is preferred for the active reports to work correctly.

These are used so the Java engine can determine the Src and Dst legs.

m_srcIndex—index of src call leg in list of call legs for this call.

m_dstIndex—index of dst call leg in list of call legs for this call.

The call legs (the call legs are defined in the signaling engine as CDRs) have the following fields: version # (to support changes in the future), Src KEY, Src IP, Dst KEY, and Dst IP, CID Number, CID Name.

Direction for determining Src and Dst is determined by the first message in the call leg, i.e. this is the message that starts the call, for MGCP this is either a notify (for outgoing calls) or CRCX for incoming calls, and for SIP this is the INVITE.

The KEY used is protocol dependant.

CID Number is the Caller ID Phone Number. Figuring this out is dependant on protocol.

CID Name is the Name associated with the Caller ID. Figuring this out is dependant on protocol. NOTE: This may or may not be present.

The following member variables have been added to the base class CDR.
m_endTimeSecs
m_endTImeMsecs
For Sig CDRs
m_sCallIDName
m_sCallIDPhone
m_sSrcIP
m_sDstIP
m_sSrcPhone
m_sDstPhone
m_sSrcKey
m_sDstKey For SS7 CDRs
m_CIC The Source (Src) Leg is the call leg with the earliest timestamp with its Src IP address equal to an on net endpoint or the earliest call leg. When a new call leg is added to an existing Call, the call legs are sorted on time (earliest to latest). Then the following procedure is executed to find the Src Leg.

```
Src Leg = NULL
For each call leg (I = 1 . . . n)
    Cur Call Leg = Call Leg[I]
    If (Cur Call Leg Src IP address == Any On Net Endpoint)
        Src Leg = cur Call Leg
        Break;
    End if
End if
If Src Leg == NULL
    Src Leg = Call Leg[0]
End if
```

The Destination (Dst) Leg is the call leg with the latest timestamp with its Dst IP address equal to an on net endpoint or the latest call leg.

When a new call leg is added to an existing Call, the call legs are sorted on time (earliest to latest). Then the following procedure is executed to find the Dst Call Leg.

```
Dst Leg = NULL
For each call leg (I = n . . . 1)
    Cur Call Leg = Call Leg[I]
    If (Cur Call Leg Dst IP address == Any On Net Endpoint)
        Dst Leg = cur Call Leg
        Break;
    End if
End if
If Dst Leg == NULL
    Dst Leg = Call Leg[n]
End if
```

At the end of a call, for the Source Leg the following procedure is executed:

```
If the Src IP Address of the Src Leg is an On Net End Point
    If there is a Src Phone # update the table
    Else
        Get the Dst Leg
        If the Src phone # of the Dst Leg exists
            Src Leg Src Phone # = Dst Leg Src Phone #
            Src Leg Src Display Name = Dst Leg Src Display Name
            Update the table for the Src Leg Src.
        Else
            Look in table using Src Leg Src MAC address,
```

-continued

```
        Get Phone # and Display Name.
      End if
    End if
End if
```

Referring back to FIG. 3A, for an On Net to On Net call, the Dst MGCP leg (if it has call id) will have the Src Leg's Src Phone Number and Display String. Referring to FIG. 3B, for an On Net to Off Net call, the Off Net SS7 Call leg should have a Src Phone # that is the Src Leg's Src Phone Number. There is no such thing as Off Net=>On Net where the Src Leg is an On Net End Point.

At the end of a call, for the Destination Leg the following procedure is executed:

```
If the Dst IP Address of the Dst Leg is an on net end point
    Get the Src Leg
    Get the Dst Phone# from the Src Leg
    If the Dst Phone# does not equal NULL
        Update the Dst Leg Dst Phone# with the Src Dst Phone#
        Update table for Dst Leg Dst
    End if
End if
```

For correlating SS7 to MGCP, when the call start message is received in the correlation engine from the signaling engine the following procedure is executed:

```
If the call leg is an MGCP call
    If the Src IP of the call leg is an On Net End Point
        Look up its Src MAC address in the table (add if not found)
        If found get Phone# and Set Src Phone# to it.
        Else if Dst IP of this call leg is an On Net End Point (i.e. an
inbound call)
            Look up Dst MAC address in the table (add if not found)
            If found get Dst Phone# and Set Dst Phone# to it.
            // NOTE this is the key to being able to correlate this to
SS7.
        End if
    End if
```

By Setting these fields and using the current correlation method of correlating SS7 (by phone#) any correlation between this call leg with the SS7 call leg can be determined.

When configuration end point mapping is enabled the configuration entry hm_corr_ip_endpoints is used to specify which endpoints are on net endpoints. This configuration parameter has the form:
<address>,<subnetmask>,<address>,<subnetmask>, etc . . .
for defining which addresses are on net endpoints. For example the configuration entry:
hm_corr_ip_endpoints:
10.0.0.0,255.0.0.0,24.0.0.0,255.0.0.0

Specifies all addresses starting with either 10. or 24.0 as being on net endpoints.

Figure 5:
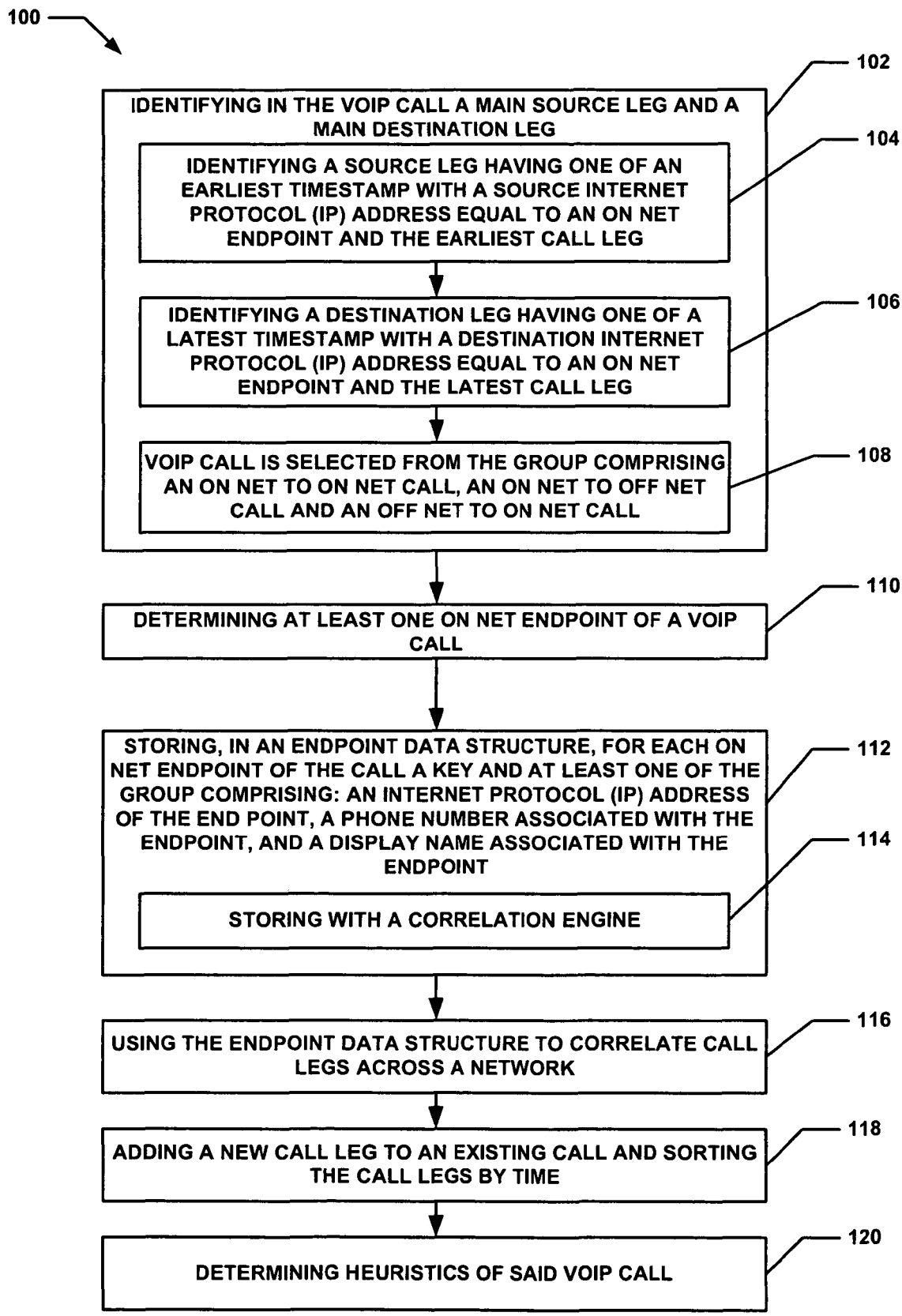
FIG. 5 shows a flow chart of an embodiment of a method for performing dynamic VOIP endpoint mapping.

A flow chart of the presently disclosed method is depicted in FIG. 5. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 5, a method of dynamic Voice Over Internet Protocol (VOIP) endpoint mapping 100 is shown. The method 100 begins with processing block 102 wherein a main source leg and a main destination leg are identified.

In processing block 104 a source leg having one of an earliest timestamp with a source Internet Protocol (IP) address equal to an on net endpoint and the earliest call leg is identified.

In processing block 106 The a destination leg having one of a latest timestamp with a destination Internet Protocol (IP) address equal to an on net endpoint and the latest call leg is also identified.

In processing block 108 the VOIP call is selected from the group comprising an on net to on net call, an on net to off net call and an off net to on net call. In processing block 110 at least one on net endpoint of a VOIP call is determined.

In processing block 112 an endpoint table is used to store, for each on net endpoint of the call, a key and at least one of the group comprising: an Internet Protocol (IP) address of the end point, a phone number associated with the endpoint, and a display name associated with the endpoint. In processing block 114 the storing in an endpoint table is done by way of a correlation engine.

In processing block 116 the endpoint table is used to correlate call legs across a network. In processing block 118 a new call leg can be added to an existing call and the call legs can be sorted by time. In processing block 120, heuristics of the VOIP call are determined, the heuristics including information relating to the main source call leg and the main destination call leg. The main source call leg and the main destination call leg are correlated by way of the endpoint mapping table, and the determined heuristics utilize the endpoint mapping table to correlate the call legs of the call, thereby providing more accurate and useful measurements and resulting data.

Figure 6:
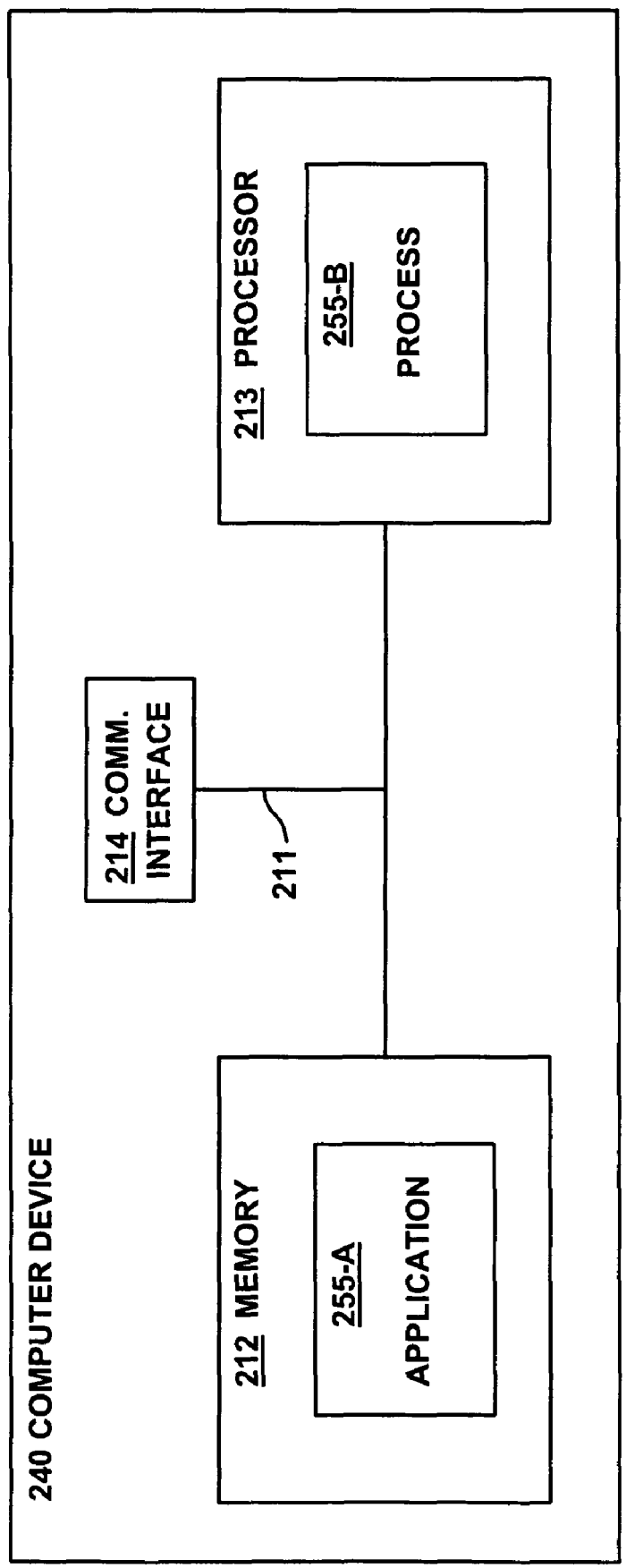
FIG. 6 illustrates an example computer system architecture for a computer system that performs dynamic Voice Over Internet Protocol endpoint mapping in accordance with embodiments of the invention.

FIG. 6 illustrates example architectures of a computer system that is configured as a host computer system 240. The computer system 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention for the agent 255 as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the computer system may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations for mapping a Voice Over Internet Protocol (VOIP) call and updating a table in a memory containing a plurality of on net end points and one or more fields corresponding to each on net end point among the plurality of on net end points, comprising the steps of:

identifying a main source leg of the VOIP call;

identifying a main destination leg of the VOIP call;

if a source IP address corresponding to the main source leg is a source on net end point, obtaining a source key from a plurality of fields corresponding to the main source leg;

if the source key can be found among the one or more fields in an entry in the table corresponding to the source on net end point, retrieving the one or more fields from the entry in the table corresponding to the source on net end point;

if the source key cannot be found in the table, creating the entry in the table corresponding to the source on net end point and adding the source key to the one or more fields in the entry in the table corresponding to the source on net end point;

if a destination IP address corresponding to the main destination leg is a destination on net end point, obtaining a destination key from a plurality of fields corresponding to the main destination leg;

if the destination key can be found among the one or more fields in an entry in the table corresponding to the destination on net end point, retrieving the one or more fields from the entry in the table corresponding to the destination on net end point;

if the destination key cannot be found in the table, creating the entry in the table corresponding to the destination on net end point and adding the destination key to the one or more fields in the entry in the table corresponding to the destination on net end point;

correlating the main source leg and the main destination leg using the one or more fields in the entry in the table corresponding to the source on net end point and the one or more fields in the entry in the table corresponding to the destination on net end point;

when the VOIP call ends, updating the entry in the table corresponding to the source on net end point with one or more fields from the plurality of fields corresponding to the main source leg, and if the one or more fields from the plurality of fields corresponding to the main source leg are missing, updating the entry in the table corresponding to the source on net end point with one or more fields from the plurality of fields corresponding to the main destination leg; and when the VOIP call ends, updating the entry in the table corresponding to the destination on net end point with one or more fields from the plurality of fields corresponding to the main destination leg, and if the one or more fields from the plurality of fields corresponding to the main destination leg are missing, updating the entry in the table corresponding to the destination on net end point with one or more fields from the plurality of fields corresponding to the main source leg, wherein updating the entry in the table corresponding to the source on net end point and the entry in the table corresponding to the destination on net end point enables a source leg of a second VOIP call having the source on net end point and a destination leg of the second VOIP call having the destination on net end point to be correlated.

2. The method as recited in claim 1, wherein the step of identifying the main source leg of the VOIP call includes either identifying a call leg with an earliest timestamp with a source IP address equal to an on net end point or identifying an earliest call leg.

3. The method as recited in claim 1, wherein the step of identifying the main destination leg of the VOIP call includes either identifying a call leg with a latest timestamp with a destination IP address equal to an on net end point or identifying a latest call leg.

4. The method as recited in claim 1, wherein the plurality of fields corresponding to the main source leg and the plurality of fields corresponding to the main destination leg include the source key, the source IP address, the destination key and the destination address.

5. The method as recited in claim 4, wherein the plurality of fields corresponding to the main source leg and the plurality of fields corresponding to the main destination leg further include a CID number and a CID name.

6. The method as recited in claim 1, wherein the one or more fields in the entry table corresponding to the source on net end point includes two or more fields selected from the group of fields comprising the source key, the source IP address, a phone number and a display name.

7. The method as recited in claim 1, wherein the one or more fields in the entry table corresponding to the destination on net end point includes two or more fields selected from the group of fields comprising the destination key, the destination IP address, a phone number and a display name.

8. The method as recited in claim 1, wherein the VOIP call is selected from the group comprising an on net to on net call, an on net to off net call and an off net to on net call.

9. The method as recited in claim 1, wherein the source key is a MAC address corresponding to the source IP address.

10. The method as recited in claim 1, wherein the destination key is a MAC address corresponding to the destination IP address.

11. A non-transitory computer readable medium storing computer readable code thereon for mapping a Voice Over Internet Protocol (VOIP) call and updating a table in a memory containing a plurality of on net end points and one or more fields corresponding to each on net end point among the plurality of on net end points, the computer readable code including instructions used by a computer system to perform operations, the instructions comprising:

instructions for identifying a main source leg of the VOIP call;

instructions for identifying a main destination leg of the VOIP call;

if a source IP address corresponding to the main source leg is a source on net end point, instructions for obtaining a source key from a plurality of fields corresponding to the main source leg;

if the source key can be found among the one or more fields in an entry in the table corresponding to the source on net end point, instructions for retrieving the one or more fields from the entry in the table corresponding to the source on net end point;

if the source key cannot be found in the table, instructions for creating the entry in the table corresponding to the source on net end point and adding the source key to the one or more fields in the entry in the table corresponding to the source on net end point;

if a destination IP address corresponding to the main destination leg is a destination on net end point, instructions for obtaining a destination key from a plurality of fields corresponding to the main destination leg;

if the destination key can be found among the one or more fields in an entry in the table corresponding to the destination on net end point, instructions for retrieving the one or more fields from the entry in the table corresponding to the destination on net end point;

if the destination key cannot be found in the table, instructions for creating the entry in the table corresponding to the destination on net end point and adding the destination key to the one or more fields in the entry in the table corresponding to the destination on net end point;

instructions for correlating the main source leg and the main destination leg using the one or more fields in the entry in the table corresponding to the source on net end point and the one or more fields in the entry in the table corresponding to the destination on net end point;

when the VOIP call ends, instructions for updating the entry in the table corresponding to the source on net end point with one or more fields from the plurality of fields corresponding to the main source leg, and if the one or more fields from the plurality of fields corresponding to the main source leg are missing, updating the entry in the table corresponding to the source on net end point with one or more fields from the plurality of fields corresponding to the main destination leg; and when the VOIP call ends, instructions for updating the entry in the table corresponding to the destination on net end point with one or more fields from the plurality of fields corresponding to the main destination leg, and if the one or more fields from the plurality of fields corresponding to the main destination leg are missing, updating the entry in the table corresponding to the destination on net end point with one or more fields from the plurality of fields corresponding to the main source leg, wherein updating the entry in the table corresponding to the source on net end point and the entry in the table corresponding to the destination on net end point enables a source leg of a second VOIP call having the source on net end point and a destination leg of the second VOIP call having the destination on net end point to be correlated.

12. The computer readable medium as recited in claim 11, wherein the instructions for identifying the main source leg of the VOIP call includes instructions for either identifying a call leg with an earliest timestamp with a source IP address equal to an on net end point or identifying an earliest call leg, and wherein the instruction for identifying the main destination leg of the VOIP call includes instructions for either identifying a call leg with a latest timestamp with a destination IP address equal to an on net end point or identifying a latest call leg.

13. The computer readable medium as recited in claim 11, wherein the plurality of fields corresponding to the main source leg and the plurality of fields corresponding to the main destination leg include the source key, the source IP address, the destination key and the destination address.

14. The computer readable medium as recited in claim 13, wherein the plurality of fields corresponding to the main source leg and the plurality of fields corresponding to the main destination leg further include a CID number and a CID name.

15. The computer readable medium as recited in claim 11, wherein the one or more fields in the entry table corresponding to the source on net end point includes two or more fields selected from the group of fields comprising the source key, the source IP address, a phone number and a display name, and wherein the one or more fields in the entry table corresponding to the destination on net end point includes two or more fields selected from the group of fields comprising the destination key, the destination IP address, a phone number and a display name.

16. The computer readable medium as recited in claim 11, wherein the VOIP call is selected from the group comprising an on net to on net call, an on net to off net call and an off net to on net call.

17. The computer readable medium as recited in claim 11, wherein the source key is a MAC address corresponding to the source IP address.

18. The computer readable medium as recited in claim 11, wherein the destination key is a MAC address corresponding to the destination IP address.

19. A computer system, comprising:
a memory;
a processor;
a communications interface;
an interconnection mechanism coupling the memory, the processor and the communications interface; and
wherein the memory is encoded with an application for mapping a Voice Over Internet Protocol (VOIP) call and updating a table in the memory containing a plurality of on net end points and one or more fields corresponding to each on net end point among the plurality of on net end points, that when performed on the processor provides a process for processing information, the process causing the computer system to perform the operations of:
identifying a main source leg of the VOIP call;
identifying a main destination leg of the VOIP call;

if a source IP address corresponding to the main source leg is a source on net end point, obtaining a source key from a plurality of fields corresponding to the main source leg;

if the source key can be found among the one or more fields in an entry in the table corresponding to the source on net end point, retrieving the one or more fields from the entry in the table corresponding to the source on net end point;

if the source key cannot be found in the table, creating the entry in the table corresponding to the source on net end point and adding the source key to the one or more fields in the entry in the table corresponding to the source on net end point;

if a destination IP address corresponding to the main destination leg is a destination on net end point, obtaining a destination key from a plurality of fields corresponding to the main destination leg;

if the destination key can be found among the one or more fields in an entry in the table corresponding to the destination on net end point, retrieving the one or more fields from the entry in the table corresponding to the destination on net end point;

if the destination key cannot be found in the table, creating the entry in the table corresponding to the destination on net end point and adding the destination key to the one or more fields in the entry in the table corresponding to the destination on net end point;

correlating the main source leg and the main destination leg using the one or more fields in the entry in the table corresponding to the source on net end point and the one or more fields in the entry in the table corresponding to the destination on net end point;

when the VOIP call ends, updating the entry in the table corresponding to the source on net end point with one or more fields from the plurality of fields corresponding to the main source leg and if the one or more fields from the plurality of fields corresponding to the main source leg are missing, updating the entry in the table corresponding to the source on net end point with one or more fields from the plurality of fields corresponding to the main destination leg; and when the VOIP call ends, updating the entry in the table corresponding to the destination on net end point with one or more fields from the plurality of fields corresponding to the main destination leg and if the one or more fields from the plurality of fields corresponding to the main destination leg are missing, updating the entry in the table corresponding to the destination on net end point with one or more fields from the plurality of fields corresponding to the main source leg, wherein updating the entry in the table corresponding to the source on net end point and the entry in the table corresponding to the destination on net end point enables a source leg of a second VOIP call having the source on net end point and a destination leg of the second VOIP call having the destination on net end point to be correlated.

20. The computer system as recited in claim 19, wherein identifying the main source leg of the VOIP call includes either identifying a call leg with an earliest timestamp with a source IP address equal to an on net end point or identifying an earliest call leg, and wherein identifying the main destination leg of the VOIP call includes either identifying a call leg with a latest timestamp with a destination IP address equal to an on net end point or identifying a latest call leg.

21. The computer system as recited in claim 19, wherein the plurality of fields corresponding to the main source leg and the plurality of fields corresponding to the main destination leg include the source key, the source IP address, the destination key and the destination IP address.

22. The computer system as recited in claim 21, wherein the plurality of fields corresponding to the main source leg and the plurality of fields corresponding to the main destination leg further include a CID number and a CID name.

23. The computer system as recited in claim 19, wherein the one or more fields in the entry table corresponding to the source on net end point includes two or more fields selected from the group of fields comprising the source key, the source IP address, a phone number and a display name, and wherein the one or more fields in the entry table corresponding to the destination on net end point includes two or more fields selected from the group of fields comprising the destination key, the destination IP address, a phone number and a display name.

24. The computer system as recited in claim 19, wherein the VOIP call is selected from the group comprising an on net to on net call, an on net to off net call and an off net to on net call.

25. The computer system as recited in claim 19, wherein the source key is a MAC address corresponding to the source IP address.

26. The computer system as recited in claim 19, wherein the destination key is a MAC address corresponding to the destination IP address.

* * * * *

UNITED STATES PATENT AND TRADEMARK OFFICE
CERTIFICATE OF CORRECTION

| | |
|---|---|
| PATENT NO. | : 7,773,582 B2 |
| APPLICATION NO. | : 11/265379 |
| DATED | : August 10, 2010 |
| INVENTOR(S) | : Smith et al. |

It is certified that error appears in the above-identified patent and that said Letters Patent is hereby corrected as shown below:

In column 3, line 35, after "leg" insert -- ; --.

In column 4, line 60, delete "fil)e" and insert -- file) --, therefor.

In column 6, line 4, delete "m_endTImeMsecs" and insert -- m_endTimeMsecs --, therefor.

Signed and Sealed this
Tenth Day of May, 2011

David J. Kappos
*Director of the United States Patent and Trademark Office*